United States Patent [19]

Rogers

[11] 4,124,036
[45] Nov. 7, 1978

[54] VALVE HAVING ELLIPSOID VALVE MEMBER

[75] Inventor: Phillip W. Rogers, Mexico City, Mexico

[73] Assignee: A. Dean Mammel, Dallas, Tex.

[21] Appl. No.: 858,639

[22] Filed: Dec. 8, 1977

Related U.S. Application Data

[63] Continuation of Ser. No. 680,774, Apr. 27, 1976, abandoned, which is a continuation-in-part of Ser. No. 664,676, Mar. 8, 1976, abandoned.

[30] Foreign Application Priority Data

Jun. 10, 1975 [MX] Mexico ................................. 159171

[51] Int. Cl.$^2$ .............................................. F16K 5/20
[52] U.S. Cl. .................................... 137/375; 251/148; 251/160; 251/315
[58] Field of Search .................. 137/15, 237, 238, 242; 251/148, 157, 158, 160, 170, 172, 192, 315; 285/332.1

[56] References Cited

U.S. PATENT DOCUMENTS

| 3,064,937 | 11/1962 | Pryor | 251/315 X |
| 3,096,965 | 7/1963 | Margus et al. | 251/315 X |
| 3,157,380 | 11/1964 | Sivyer | 251/315 X |
| 3,182,952 | 5/1965 | Montesi | 251/315 X |
| 3,371,907 | 3/1968 | Scaramucci | 251/172 X |
| 3,406,707 | 10/1968 | Schenck | 137/375 |
| 3,780,985 | 12/1973 | Perry | 251/309 |

Primary Examiner—Martin P. Schwadron
Assistant Examiner—Richard Gerard
Attorney, Agent, or Firm—Richards, Harris & Medlock

[57] ABSTRACT

The specification discloses a valve including a valve body with a longitudinal central passage therethrough. A truncated ellipsoid valve member is located within the central passage of the valve body. The ellipsoid member has major and minor axes and has an aperture extending along the major axis thereof. Annular resilient seats are disposed in contact with opposite end portions of the ellipsoid member. A handle is provided to rotate the ellipsoid member between open and closed positions. In the open position, the aperture through the ellipsoid member is aligned with the central passage of the valve body and the ellipsoid member causes deformation of the resilient seats to prevent leakage of fluid around the exterior of the ellipsoid member.

3 Claims, 14 Drawing Figures

VALVE HAVING ELLIPSOID VALVE MEMBER

RELATED APPLICATION

This is a continuation of application Ser. No. 680,774 filed Apr. 27, 1976, now abandoned, which was a continuation-in-part of application Ser. No. 664,676 filed Mar. 8, 1976 entitled "Improvements In Valves For Fluids", now abandoned.

FIELD OF THE INVENTION

This invention relates to valves, and more particularly relates to a valve having a truncated ellipsoid valve member configuration.

THE PRIOR ART

Ball valves are commonly used in many different applications for valving liquid and gases in pipelines or other conduits. Such ball valves generally include a spherical valve member with an aperture extending therethrough, along with a seal to reduce leakage of the valve in the closed position. Such conventional ball valves have generally been limited to valve apertures which have a smaller diameter than the internal diameter of the conduit attached to the valve. Such reduced apertures cause a flow restriction that creates increased back pressure in the conduit on the inlet side of the valve and a pressure drop on the discharge side of the valve. Such a pressure drop reduces the accuracy of measurements and metering of the fluid flow, and the resulting increased pressure intensifies the erosion and corrosion of such prior valves. To obtain full flow with prior valves, pipe reducers have been required, along with an oversize valve. Prior ball valves also have often included surfaces to which incrustation of extraneous flow material has been deposited, thereby inhibiting operation of the valve.

Another very serious disadvantage of prior ball valves is leakage of the valve in the open position. Such leakage occurs due to the lack of an adequate seal between the interior of the valve housing and the exterior of the valve ball and thus fluid passes around the exterior surface of the valve ball when in the open position. This leakage of fluid causes corrosion and erosion due to fluid abrasion of the valve housing and the valve ball, and also results in excessive pressure against the valve handle stem, often causing leakage at the valve stem. Even when expensive non-corrosive metal is utilized for the valve housing and ball to counter corrosion, erosion can still occur due to valve leakage when the valve is utilized with high pressure abrasive fluid. Moreover, such prior ball valves have not been easily disassembled and constructed so as to enable replacement of parts such as the ball valve, a problem which is magnified when the valve housing is so corroded and eroded that the entire valve must be replaced.

It has been heretofore proposed to utilize valve members having irregular shapes in order to produce increased sealing when the valve is placed in the closed position. Examples of such valves are described in U.S. Pat. No. 3,064,937 entitled "Rotary Valve" by C. C. Pryor; U.S. Pat. No. 3,157,380 entitled "Ball Valve" by R. B. Sivyer and U.S. Pat. No. 3,780,985 entitled "Valve With Elliptical Sealing" by Dean A. Perry. However, no provision is made in any of these prior designs for increased sealing when the valve is in the open position, and thus such prior valves are subject to leakage when in the open position, thereby resulting in corrosion and erosion of the valve housing. Moreover, such previously developed valves, due to their construction, have been difficult to rebuild or repair in the operational field.

SUMMARY OF THE INVENTION

In accordance with the present invention, a valve is provided which substantially eliminates or reduces the problems and inadequacies heretofore associated with previously developed valves.

In accordance with the invention, the present valve includes a valve body having a longitudinal central passage therethrough. A truncated ellipsoid member is located within the central passage and includes major and minor axes. An aperture extends along the major axis of the ellipsoid member. Annular resilient seats contact opposite end portions of the ellipsoid member to provide sealing between the valve body and the ellipsoid member. Structure is provided to rotate the ellipsoid member to open and closed positions.

In accordance with a more specific aspect of the invention, a valve body has a longitudinal central passage therethrough with a truncated ellipsoid member located therewithin. The ellipsoid member includes major and minor axes with an aperture extending along the major axis thereof. Annular resilient seats contact opposite end portions of the ellipsoid member. A handle is connected to rotate the ellipsoid member to open and closed positions. Rotation of the ellipsoid member to the open position distorts the resilient seats to increase the sealing contact between the seat and the ellipsoid member. Rotation of the ellipsoid member from the closed to the open position provides a cleansing action of the seat and the ellipsoid member to dislodge any flow material deposited thereon. Annular spacer rings contact the resilient seats and end couplings are connected to the valve body to bear against the spacer rings. The end couplings include tapered faces wherein the end couplings may be assembled and secured to the valve body in misalignment therewith.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
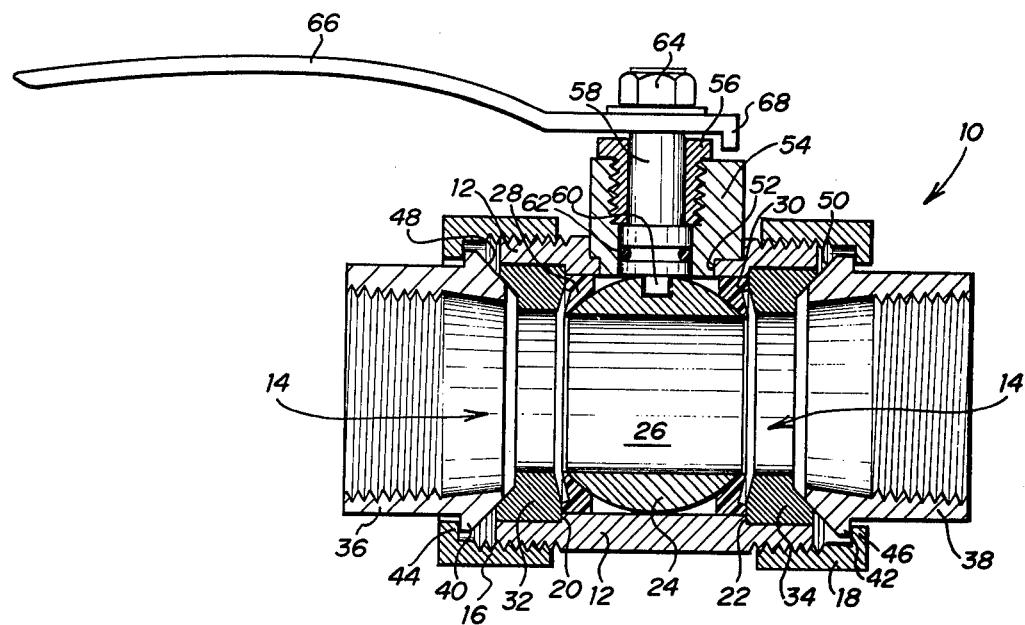
FIG. 1 is an elevational cross sectional view of the present valve.

Referring to FIG. 1, the present valve is indicated generally by the numeral 10 and includes a central valve body 12 which comprises a cylindrical metal housing with opposing open ends and an internal central passage 14. The external end surfaces of the valve body 12 are threaded in order to threadedly receive half union nuts 16 and 18. The interior ends of the valve body 12 are counterbored to provide annular shoulders 20 and 22.

An important aspect of the invention is the provision of a truncated ellipsoid valve member 24 which includes an aperture 26 extending therethrough. Annular flexible seals or seats 28 and 30 are positioned within the central passage 14 adjacent opposite ends of the ellipsoid valve member 24. Rigid annular spacer rings 32 and 34 are disposed within the counterbored ends of the valve housing 12 and abut against the shoulders 20 and 22. The spacer rings 32 and 34 serve to position the seats 28 and 30 in the desired location.

Union couplings 36 and 38 are positioned adjacent the spacer rings 32 and 34. The union couplings include annular flanges 40 and 42 which abut with annular lips 44 and 46 of the nuts 16 and 18. The interior of the union couplings are threaded for reception of threaded pipe or conduit to which the present valve is connected. As will be subsequently described in greater detail, the union couplings 36 and 38 include beveled faces 48 and 50 which enable interconnection of the present valve to conduit sections which are not perfectly aligned with one another.

The upper portion of the valve body 12 includes a circular recess 52 for receiving an eccentric handle guide 54. A threaded aperture is formed through the guide 54 along an axis eccentric to the center of the guide 54 for threadedly receiving a removable sleeve fitting 56. A handle stem 58 extends through the sleeve fitting 56 and through the guide 54. The stem 58 includes a projection 60 which interfits into a slot formed in the top of the ellipsoid valve member 24. An O-ring seal 62 is provided about the stem 58 to prevent leakage therethrough. The sleeve fitting 56 acts as a bushing for the stem 58 and abuts against a portion of the stem 58 to maintain it in position.

The upper portion of the stem 58 is threaded for reception of a nut 64. A handle 66 includes an aperture therein for receiving the upper portion of the stem 58 and the nut 64 affixes the handle 66 to the stem 58. Handle 66 includes a downwardly extending lip 68 for abutment with pins, to be subsequently described, extending from the eccentric handle guide 54 to act as stops for open and closed positions of the valve.

The valve shown in FIG. 1 is illustrated in the open position. In this position, the aperture 26 of the valve member 24 communicates with the passage 14 formed through the union couplings 36 and 38, the spacer rings 32 and 34 and the valve body 12. An important aspect of the present invention is that the aperture 26 formed through the ellipsoid valve member 24 is provided with a diameter which is as great as the diameter of the conduits which are threadedly attached to the union couplings 36 and 38. Due to the construction of the ellipsoid valve member 24, no substantial restriction is thus applied to the flow of material through the valve from the conduits, thereby eliminating problems in changing the pressure of material flow through the conduits.

Another important aspect of the valve shown in FIG. 1 is that, in the illustrated open position, the ellipsoid valve member 24, due to its construction as will be subsequently described, causes deformation of the flexible seats 28 and 30. This deformation thus creates a very tight seal between the seats and the ellipsoid valve member 24, thereby substantially preventing leakage between the ellipsoid valve member 24 and the valve body 12 when in the open position. Thus, corrosion and erosion of the interior of the valve body 12 are substantially eliminated by use of the present valve.

Figure 2:
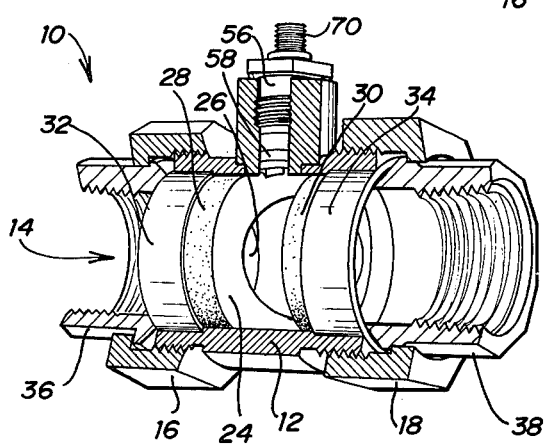
FIG. 2 is a partially sectioned perspective view of the valve shown in FIG. 1 with the handle removed.

FIG. 2 illustrates the valve 10 with the ellipsoid valve member 24 being turned to the closed position. In this figure, partially broken away for clarity of illustration, the interrelationship of the seats 28 and 30 with the spacer rings 32 and 34 is clearly shown. In addition, the abutment of the union couplings 36 and 38 against the spacer rings 32 and 34 is illustrated. In this figure, it may be seen that the ellipsoid valve member 24 is being turned such that the aperture 26 therethrough is being directed transversely to the flow of fluid through the passage 14. When the ellipsoid valve member 24 is turned such that the aperture 26 is perpendicular to the flow of fluid through the valve, the valve is then placed in the closed position and completely stops the flow of fluid therethrough. Seats 28 and 30 also act to seal against fluid flow about the valve member 24 in the closed position.

When the present valve is being used with corrosive fluids, upon closing of the valve, small amounts of the corrosive fluid may remain within the aperture 26 and thus contact the interior walls of the valve body 12. For such corrosive environments, it is desirable to provide a thin coating of noncorrosive material on the interior walls of the valve body 12. A suitable such noncorrosive coating has been found to be a coating of 0.002 inch thick material constructed from Tetrafluoroethylene, also known under the trademark "Teflon". Such a thin coating of noncorrosive material may be used on the present invention because there is no flow of material therepast to erode the coating, and the coating has only to withstand static corrosive fluid.

FIG. 2 illustrates the stem 58 with the handle 66 and the nut 64 removed. The threaded portion 70 of the stem is illustrated. The upper portion of the sleeve fitting 56 is shown to have a hex configuration for ease of removal and installation.

Figure 3:
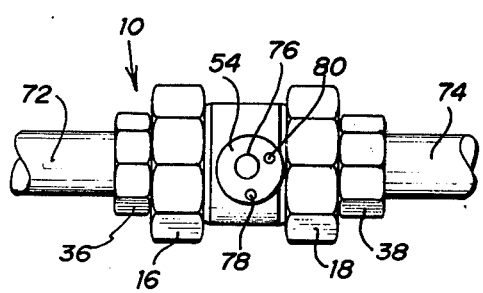
FIG. 3 is a top view of the valve of FIG. 1 with the handle assembly removed therefrom for clarity of illustration.

FIG. 3 illustrates a top view of the valve 10 with the handle 66 removed for ease of illustration. Conduits 72 and 74 are shown as being threadedly connected to the union coupling 38. The top portion of the handle guide 54 includes an aperture 76 which is eccentric to the center of the guide 54. Stem 58 fits within the aperture 76 as previously noted. Pins 78 and 80 are illustrated as being spaced apart on the upper portion of the handle guide 54 in order to engage the lip 68 of the handle 66.

Pin 80 stops the lip 68 when the valve is in the open position, while pin 78 stops the lip 68 when the valve is fully turned to the off position.

Figure 4:
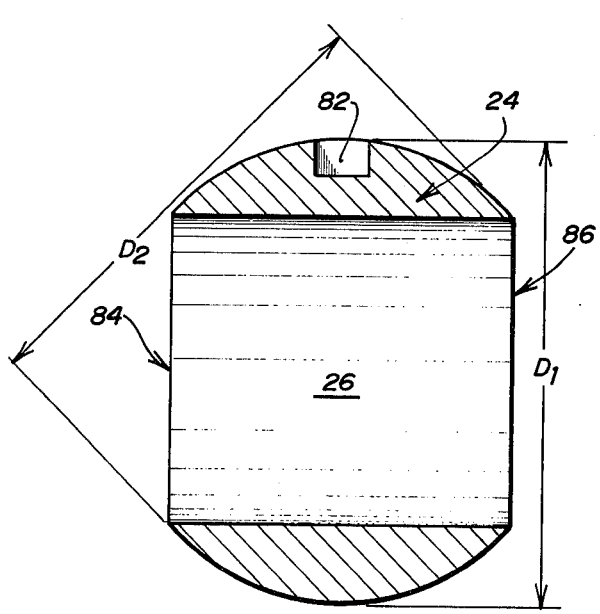
FIG. 4 is a sectional view of the ellipsoid valve member of the invention.

FIG. 4 is a sectional view taken through the center portion of the ellipsoid valve member 24. A slot 82 is formed in the upper portion of the member 24 for reception of the projection 60 of the handle stem 58 to enable turning between open and closed positions. An important aspect of the present invention is that the ellipsoid valve member 24 comprises an ellipsoid or symmetrical ovoid body which may be defined as an exterior surface with all plane sections thereof being either ellipses or circles. The ellipsoid body is then truncated to form flat annular surfaces 84 and 86 at the ends of the central aperture 26 formed therethrough.

It is also important to note that the diameter $D_1$ of member 24 as shown in FIG. 4 has a smaller magnitude than does the diameter $D_2$. This increased diameter $D_2$ causes flexing and deformation of the seats 28 and 30 during rotation of the valve member 24 between closed and open positions.

Figure 5:
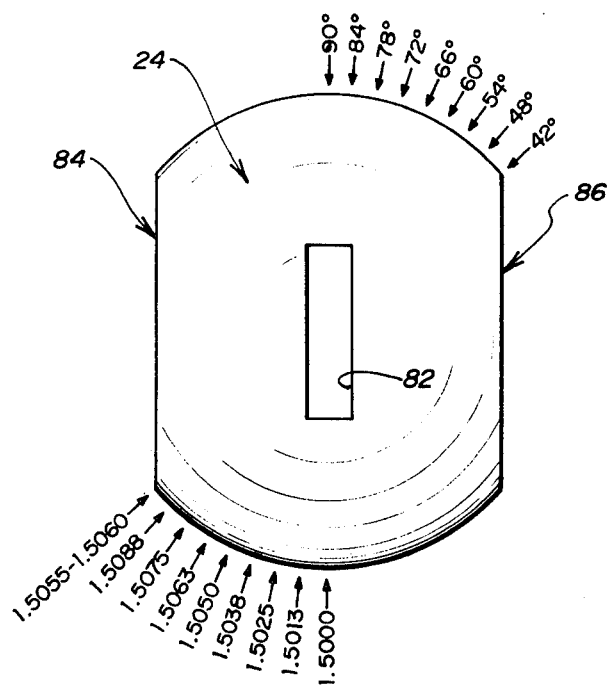
FIG. 5 is a top view of the ellipsoid valve member of the invention with legends representing the curvature thereof.
Figure 6:
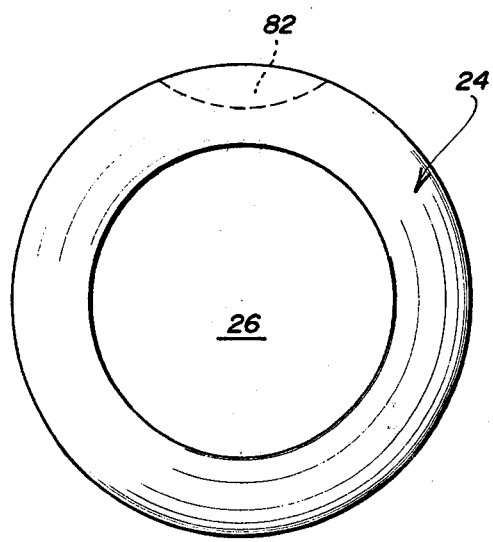
FIG. 6 is an end view of the ellipsoid member of the invention.
Figure 7:
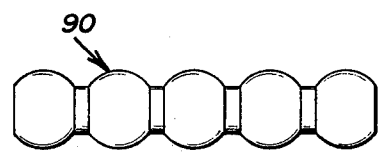
FIG. 7 is a somewhat diagrammatic view of a string of valve members formed according to the invention.

FIGS. 5 and 6 illustrate additional details of the construction of the present ellipsoid valve member 24. The channel or slot 82 may be seen to have an elongated configuration to be disposed generally parallel to the flat surfaces 84 and 86. Another important aspect of the present ellipsoid valve member is that the aperture 26 is formed along the major axis of the ellipsoid from which the truncated ellipsoid valve member 24 is formed. The aperture 26 is thus perpendicular to the minor axis of the ellipsoid. Because of this construction, when the ellipsoid valve member 24 is in the open position as shown in FIG. 1, the seats 28 and 30 are deformed to exert increased sealing. When the ellipsoid valve member 24 is rotated to the closed position, the aperture 26 is disposed transverse to the passage 14 and the seats 28 and 30 will be provided with less deformation. The seats will, however, also provide an excellent seal in the closed position as they conform to the exterior shape of member 24.

FIG. 5 illustrates diameters in inches of an embodiment of the present ellipsoid valve member which has an aperture 26 of 1 inch. The diameter of the member 24, taking a 90° section through the center, is shown to be 1.5 inches. Similarly, the diameter of the member taken at 66° is 1.505 inches, while the diameter of the member taken at 42° as illustrated is 1.5055-1.5060 inches. The particular configuration provided to the present ellipsoid valve member operates to deform the seats 28 and 30 when in the open position in order to substantially eliminate any leakage. The configuration also acts to provide a wiping action between the member 24 and the seats when the member 24 is being moved from the open to closed position. This wiping phenomena occurs because an area of large diameter $D_2$ must be accommodated by the seats during the turning operation, thereby causing substantial deformation of the seats and causing the removal of any incrustation or other debris which has accumulated either on the seats or on the ellipsoid valve member 24 during operation. This self-cleansing action substantially reduces maintenance and failure of the present valve. It will of course be understood that other dimensions may be provided to ellipsoid valve members according to the present invention other than shown in FIG. 5, depending upon the desired diameter of the aperture 26 and desired operating characteristics.

FIG. 6 is an end view of the ellipsoid valve member 24 and illustrates the substantial diameter with which the aperture 26 may be provided. In addition, FIG. 6 illustrates the curved configuration of the slot 82 in the preferred embodiment.

FIGS. 7-10 illustrate additional details in the construction and operation of the seats 28 and 30 of the invention. The ellipsoid valve member 24 may be constructed from any suitable rigid material but preferably is constructed from castings of nickel-alloy bonds. The ellipsoid valve member 24 may be constructed in the preferred embodiment from a "stick" or "string" 90 of multiple valve members constructed in the manner illustrated in FIG. 7.

The string 90 of five ellipsoid valve members as illustrated may be formed by casting of a nickel-alloy bond. The string 90 may then be placed in a lathe and a cored hole drilled through the string to the desired inside diameter. In the same lathe, each ellipsoid valve member is then cut from the string to the desired width to form the truncated configuration shown in FIGS. 4 and 5. For final finishing, each ellipsoid valve member is set on a suitable fixture having an expanding mandril by means of the bored hole therethrough and the exterior surface of the ellipsoid valve member are machined by a suitable hydraulic copying attachment mounted on a lathe. A milling cutter, such as a Woodruff key cutter is mounted on the lathe and an appropriate fixture is mounted on the cross slide of the lathe. The slot 82 for the handle stem is then machined to dimensions with the ellipsoid valve member being installed on the fixture.

Figure 8:
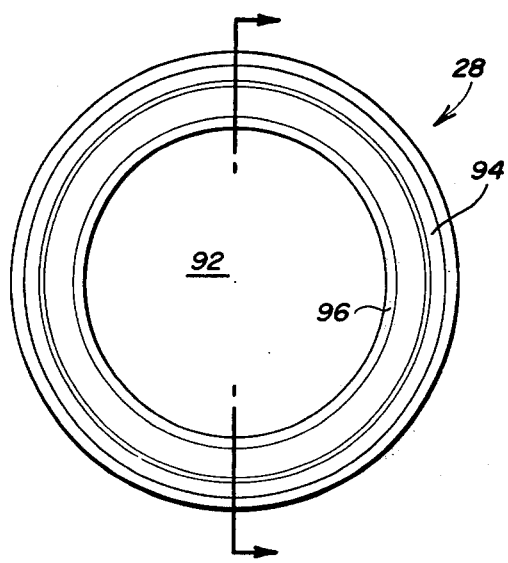
FIG. 8 is a front view of one of the annular seats of the invention.
Figure 9:
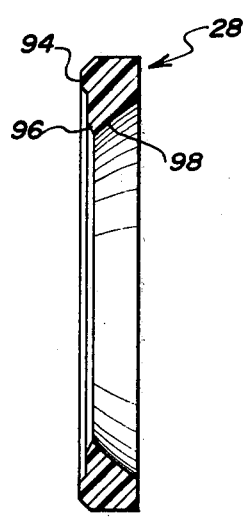
FIG. 9 is a sectional view of the seat shown in FIG. 8 illustrating the seat when in the normal closed position.
Figure 10:
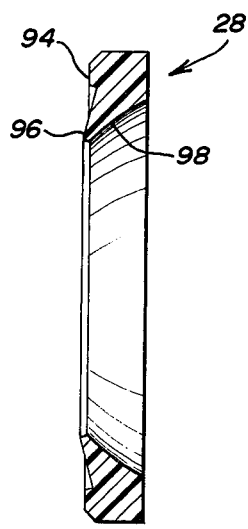
FIG. 10 is a cross sectional view of the seat shown in FIG. 8 illustrating the seat in a deformed configuration in the normal open position.

FIGS. 8, 9 and 10 illustrate the specific construction of the identical seats 28 and 30. FIG. 8 illustrates a front elevational view of seat 28. An annular central opening 92 is provided through the seat with a diameter substantially equal to the diameter of the aperture through the corresponding ellipsoid valve member 24. The seat of the present invention when used with a valve having a one inch internal diameter may, for example, have a width of 0.205 inches and an exterior diameter of 1.51 inches. Seats 28 and 30 may be constructed from any suitable flexible resilient noncorrosive material, but it has been found that pure or reinforced tetrafluoroethylene, known by the trademark "Teflon", works extremely well in corrosive environments. The seats may, however, also be constructed from nylon, neoprene, nitrile, rubber or elastomeric materials known by the trademarks "Viton" and "Delrin". Seats 28 and 30 must be formed from material which provides a tight seal against the curved edges of the ellipsoid valve member 24 and which can withstand repeated deformations during opening and closing of the valve.

FIG. 9 is a sectional view taken generally along the section lines 9—9 in FIG. 8. FIG. 9 illustrates the normal cross-section of the seat 28 when the valve is in the closed position. In this position, the seat 28 takes its normal relaxed configuration. In this relaxed configuration, the cross-section of the seat includes an annular extension 94 which bears against the spacer ring 32. The seat also includes an annular inwardly directed lip 96. The interior surface 98 of the seat 28 is configured to conform to the exterior shape of the ellipsoid valve member 24 when the valve is in the closed position to prevent leakage past the valve member.

FIG. 10 illustrates the cross sectional configuration of the seat 28 when the ellipsoid valve member 24 is in the open position. In this position, due to the increased dimensions of the member 24 which abuts the seat 28, the lip 96 is deformed outwardly in the manner illustrated. The surface 98 is thus forced to accommodate the different size of the ellipsoid valve member when in the open position. Due to the deformation of the seat 28, increased sealing is provided between the seat and the ellipsoid valve member 24 when in the open position to substantially prevent leakage. This prevention of leakage when the valve is in the open position substantially eliminates corrosion and erosion of the interior walls of the valve body 12, thereby allowing interchangeability of parts of the valve without requiring a replacement of the exterior valve body 12.

Figure 11:
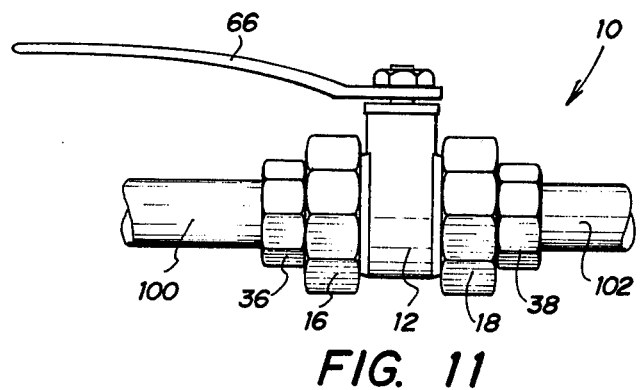
FIG. 11 is a side view of the present valve when attached to aligned conduit sections.
Figure 12:
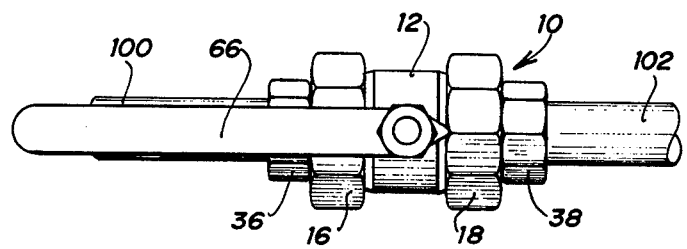
FIG. 12 is a top view of the valve attached to aligned conduit sections.

FIGS. 11 and 12 illustrate views of the valve 10 when interconnected with conduit sections 100 and 102 when the conduit sections are perfectly aligned. To install the valve 10 between the illustrated pipe sections 100 and 102, the ellipsoid valve member 24 is initially positioned within valve body 12 in the manner shown in FIG. 1. Seats 28 and 30 are then inserted on opposite sides of the valve member 24 and the spacer rings 32 and 34 are inserted through the open ends of the valve body 12 to abut against the seats and properly position and tension the seats against the valve member 24. The union couplings 36 and 38 are then inserted against the spacer rings and the union nuts 16 and 18 are inserted over the union couplings and are tightened on the valve body 12. The threaded ends of the conduits 100 and 102 are then threadedly connected to the union couplings 36 and 38 and the entire assembly is tightened for operation. The material flowing through the pipes 100 and 102, whether it be liquid or gas, may be allowed to flow or shut off by moving the handle 66 between open or closed positions, thereby moving the ellipsoid valve member 24 between the open and closed positions as previously noted.

Figure 13:
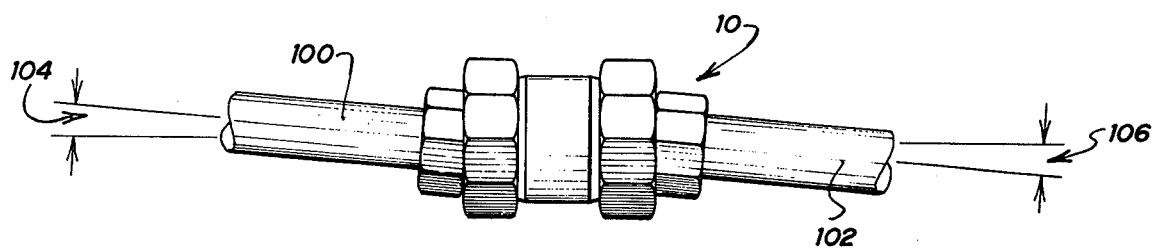
FIG. 13 is a bottom view of the present valve showing the attachment of the valve to conduit sections which are misaligned in opposite directions.

An important aspect of the present invention is that the pipe sections 100 and 102 do not need to be perfectly aligned with one another in order to enable connection of the present valve therebetween. For example, FIG. 13 illustrates a bottom view of the present valve 10 connected between pipe sections 100 and 102 which are misaligned in opposite directions. For example, the pipe section 100 is misaligned upwardly from the horizen by an angle 104, while pipe section 102 is misaligned downwardly from the horizontal by an angle 106. Angles 104 and 106 may be, for example, seven degrees.

Figure 14:
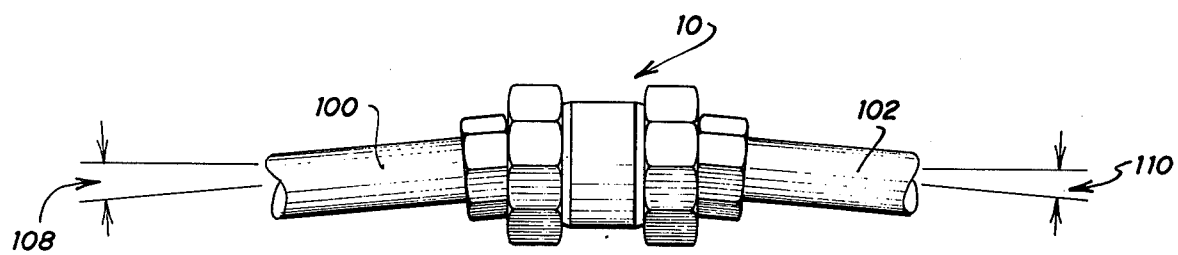
FIG. 14 is a bottom view of the present valve when the valve is connected to conduit sections misaligned in the same direction.

Similarly, the pipe sections 100 and 102 may be misaligned in the same direction, as illustrated in FIG. 14. In this figure, pipe section 100 is misaligned downwardly by an angle 108, while the pipe section 102 is misaligned downwardly from the horizon by an angle 110. In each of the instances shown in FIGS. 13 and 14, the valve 10 is able to be easily installed and yet operate without problems.

The structure of the valve 10 which enables the connection of pipe sections in misalignment is the mating configuration between the spacer rings 32 and 34 and the union couplings 36 and 38. As previously noted, the tapered or beveled faces 48 and 50 of the union couplings are conical shaped, thereby allowing a certain degree of misalignment between the union couplings and the valve body 12. The conical surfaces 48 and 50 mate with similar inwardly directed conical surfaces in the spacers 32 and 34 so as to provide sealing between the union couplings and the valve even through the union couplings are misaligned.

Another important aspect of the present invention is that, after use of the valve for a period of time, the nuts 16 and 18 may be loosened and the valve 10 removed between the pipe sections 100 and 102. If there is wear in the seats or the valve member, the removable interior members of the valve may be removed and easily replaced. Because of the construction and operation of the valve, the valve body 12 will generally not be required to be replaced, thereby saving substantial expenditures. The present valve enables easy removal and installation of the various interior components to enable the use of replacement kits for the valve, unlike many prior valves which had to be completely replaced.

The present valve allows full flow of fluid or gaseous material therethrough without any substantial flow restriction or decrease in pressure of the fluid flow. The valve includes complete sealing and eliminates the possibility of the danger of expulsion or extrusion of the seals by a high flow of material through the valve. As noted, the seal and the entire valve assembly may be removed and replaced, without the requirement of the replacement of the exterior valve body. The valve stem and the accompanying seal may be easily removed and replaced without removing the valve body from the conduit. The conical seats at the extreme ends of the valve body permit easy and simple installation even though the conduit sections are not in alignment.

Another important aspect of the invention is that the half union configuration of the invention permits complete rotation of the valve, even though the valve is connected to conduits and even though the valve is under pressure of material flow therethrough. The double seats on opposite sides of the ellipsoid valve member are self-lubricating and provide a hermetic seal on the ellipsoid valve member. As previously noted, the construction of the ellipsoid valve member enables a greater seal against leakage when the valve is in the open position to prevent the corrosion or erosion of the interior housing surfaces. The provision of a non-corrosive thin coating on the interior of the housing also eliminates corrosion due to small amounts of material being carried by the ellipsoid valve member when in the closed position.

The present ellipsoid valve member is constructed so as to "float" within the valve body, and may be constructed with a port opening equivalent to or greater than the internal diameter of the conduit to which the valve is attached. The particular configuration of the ellipsoid valve member and the sealing seats provides a self-cleaning action due to deformation of the seats upon rotation of the valve member.

The present valve is designed to eliminate the requirement of extra or additional accessories such as pipe unions or nipples in order to install the valve. The present valve is designed to provide simplicity and foolproof operation, and yet may be manufactured from relatively inexpensive materials to provide maximum efficiency of operation. The construction of the present valve without leakage in the open or closed position enables the use of a corrosive material for the construction of an outer valve body 12 such as steel, bronze or iron. Previously developed valves for use with corrosive materials have often been required to be made of very expensive stainless steel.

The present valve is particularly useful for high pressure flows of very corrosive material. For example, a valve constructed in accordance with the present invention with a one inch internal diameter has been heretofore connected to a one inch internal diameter pipe in which fluorospar slurry has been flowed at pressures of from b 50 psi to 150 psi. The fluorospar slurry included 46% to 52% solid calcium fluoride which results in from 8% to 10% hydrofluoric acid. The present valve has been used in such an environment for a period greater than four times the lifetime of a conventional ball valve, with no evidence of corrosion of the valve and with no leakage of the valve.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An improved valve comprising:
   a rigid symmetrical valve body having symmetrical open opposed ends and a circular passage therethrough,
   counterbores formed in each of said opposed ends of said valve body to form annular shoulders therein,
   a truncated ellipsoid member located in the central portion of said valve body within said passage, said ellipsoid member having major and minor axes and being truncated at the opposite ends of said major axis,
   means defining an aperture through said ellipsoid member along said major axis,
   annular resilient seats disposed within said valve body in sealing relation with opposed ends of said ellipsoid member, said resilient seats having curved interior surfaces for conforming to the exterior of said ellipsoid member and external surfaces, said seats having flexible annular lips radially inwardly disposed and capable of being flexed and deformed by movement of said ellipsoid member,
   annular spacer rings each removably disposed in an end of said valve body and abutting said annular shoulders and external surfaces of said seats to urge said seats against said ellipsoid member,
   union couplings rigidly connectable to the ends of said valve body for abutting said spacer rings for independently urging each of said spacer rings against one of said shoulders and one of said resilient seats, said union couplings further including means for attachment to conduits,
   a handle stem rotatably extending through a side wall of said valve body and removably coupled to rotate said ellipsoid member, wherein said ellipsoid member may be rotated between open and closed positions,
   said aperture along said major axis being coaxially aligned with said circular passage in said open position to allow fluid through the valve and said aperture being disposed perpendicular to said circular passage in said closed position to block the flow of fluid through the valve; and
   said ellipsoid member being dimensioned to deform said annular lips of said resilient seats when in said open position by an extent greater than when in said closed position in order to reduce corrosion and abrasion of the exterior of said ellipsoid member by inhibiting fluid from flowing between the interior of said valve body and the exterior of said ellipsoid member when in said open position.

2. The improved valve of claim 1 wherein said union couplings include tapered faces to enable connection to said valve body in misalignment with said circular passage.

3. The improved valve of claim 1 and further comprising:
   a thin coating of non-corrosive material is formed on the interior surfaces of said valve body.

* * * * *